United States Patent [19]

Machado et al.

[11] Patent Number: 4,901,418

[45] Date of Patent: Feb. 20, 1990

[54] GOLF HEAD REMOVAL TOOL

[76] Inventors: Rodney I. Machado, 66328 Cactus Dr., Desert Hot Springs, Calif. 92240; Marc I. Machado, 82-281 Rebecca Ct., Indio, Calif. 92201

[21] Appl. No.: 278,443

[22] Filed: Dec. 1, 1988

[51] Int. Cl.[4] .......... B23P 19/04

[52] U.S. Cl. .......... 29/263; 29/266

[58] Field of Search .......... 29/256, 257, 258, 259, 29/263, 265, 266, 237

[56] References Cited

U.S. PATENT DOCUMENTS

| | | | |
|---|---|---|---|
| 664,565 | 1/1900 | Livingood . | |
| 1,094,978 | 4/1914 | Church | 29/237 |
| 1,365,559 | 1/1921 | Starks | 29/257 |
| 1,590,918 | 6/1926 | Tindell | 29/251 |
| 1,707,870 | 4/1929 | Morton | 29/256 |
| 1,865,420 | 6/1932 | Kick | 29/256 |
| 1,866,125 | 5/1932 | Patterson . | |
| 2,650,419 | 1/1953 | Barbisch | 29/266 |
| 2,761,338 | 9/1956 | Hector et al. | 81/3.38 |
| 2,820,285 | 1/1958 | Neumeister | 29/258 |
| 2,860,407 | 11/1958 | Grunder et al. | 29/258 |
| 3,007,241 | 11/1961 | Gonzales | 29/266 |
| 3,009,313 | 11/1961 | Wheeler | 59/7 |
| 3,183,585 | 5/1965 | West . | |
| 3,281,929 | 11/1966 | Shinnick | 29/237 |
| 3,299,496 | 1/1967 | Christensen | 29/237 |
| 3,599,311 | 8/1971 | Ellis | 29/259 |
| 3,727,289 | 4/1973 | Bemelmann et al. | 29/237 |
| 3,777,354 | 12/1973 | Masters | 29/237 |
| 3,786,551 | 1/1974 | Gregg et al. . | |
| 3,988,819 | 11/1976 | Sato | 29/237 |
| 4,057,889 | 11/1977 | Ferguson | 29/427 |
| 4,406,182 | 9/1983 | Antone | 29/266 |
| 4,642,866 | 2/1987 | Murtaugh | 29/259 |

OTHER PUBLICATIONS

The Golfworks Catalog—pp. 2-26.

*Primary Examiner*—Robert C. Watson
*Attorney, Agent, or Firm*—Harvey S. Hertz

[57] ABSTRACT

A golf club head removal tool includes a main block which can be secured to a fixed member such as a vise or work bench, and a locking plate for securing the golf club shaft to the main block. A force plate is formed in a plane parallel to the main block and has an opening therein for positioning the golf club shaft therein. A drive bolt is secured to the force plate and movable along its axis for moving the force plate with respect to the main block. Stabilizing pins retain the force plate in a plane perpendicular to the drive bolt axis when the force plate moves with respect to the main block.

2 Claims, 2 Drawing Sheets

FIG. 2
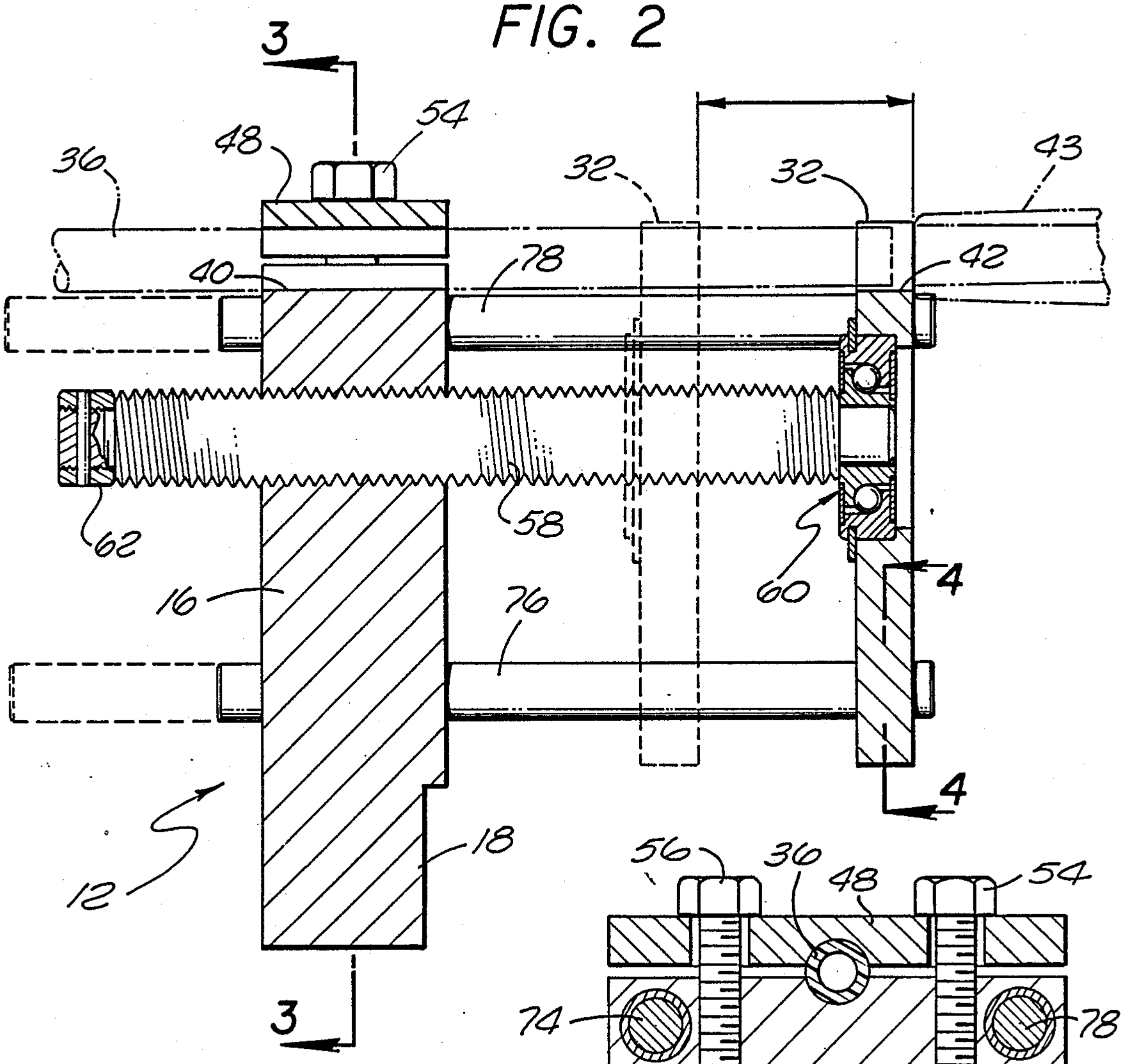
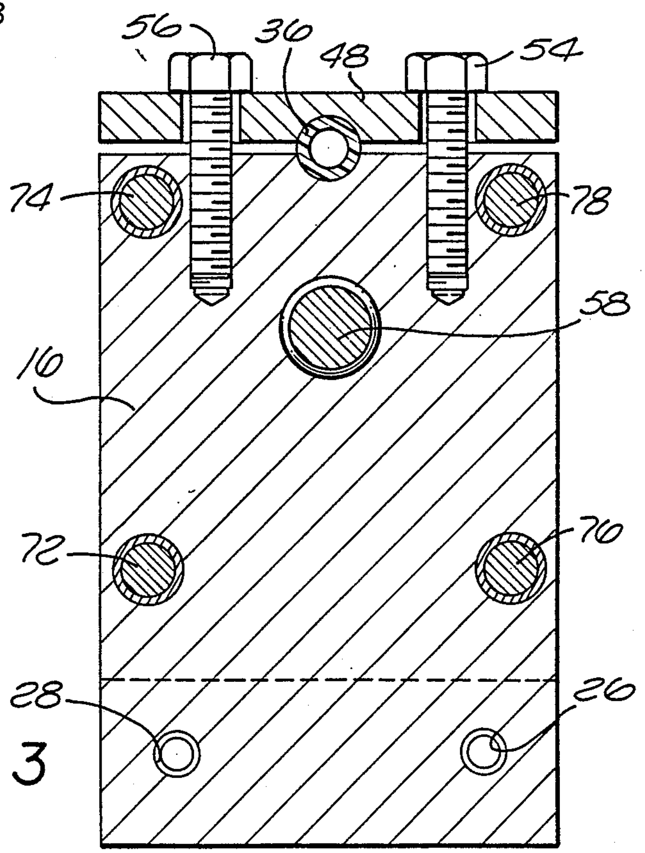
FIG. 3
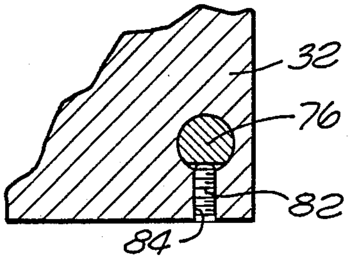
FIG. 4

GOLF HEAD REMOVAL TOOL

BACKGROUND OF THE INVENTION (1) Field of the Invention: The field of art to which the invention pertains includes the field of golf club removal tools and, more particularly, with respect to a golf club head removal tool having a force plate which will not rotate with respect to the golf club head during removal.

(2) Description of the Prior Art: Conventional tools for removing golf club heads from the golf club shaft are well known. The golf club shaft is secured to a main block and the hosel of the golf club head is positioned adjacent a force plate. Movement of the force plate with respect to the main block separates the golf club head from the main shaft of the golf club. Such tools, while well known, are not recommended for removing graphite, fiberglass, vinyl coated or aluminum shafts from a golf club head. It has been found that in such removal tools, the force plate tends to rotate, rotating the club head and thus destroying the fiber in a graphite shaft or other material from other types of shafts.

Known prior art includes U.S. Pat. Nos. 4,406,182; 4,642,866; 2,860,407; 664,565; 2,761,338; 3,599,311; 4,057,889; 2,820,285; 3,007,241; 2,650,419; 3,009,313; 3,183,585; 3,786,551 and 1,866,125.

In the present invention, stabilizing pins, which are secured to the force plate and are interconnected between the force plate and the main block, prevent the force plate from rotating with respect to the golf club head. Such rotating, tilting, or twisting can destroy the fibers of a graphite shaft or the material from which other golf club shafts are made of during the removal process.

SUMMARY OF THE INVENTION

A golf club head removal tool includes the main block which is secured to a fixed member and a locking plate for securing the golf club shaft to the main block. A force plate is formed and in a plane parallel to the main block and has an opening therein for positioning a golf club shaft therein. A drive bolt is secured to the force plate and movable along its axis with respect to the main block for moving the force plate with respect to the main block. Stabilizing pins keep the force plate in a plane perpendicular to the drive bolt axis when the force plate moves with respect to the main block.

The advantages of this invention, both as to its description and mode of operation, will be readily appreciated as the same becomes better understood by reference to the following accompanying drawings in which like referenced numerals indicate like parts throughout the figures.

BRIEF DESCRIPTION OF THE DRAWINGS

FIG. 2 is a cross-sectional view of the golf club head removal tool taken along the line 2—2 of FIG. 1;

FIG. 3 is a cross-sectional view of the golf club head removal tool taken along the line 3—3 of FIG. 2; and FIG. 4 is a partial cross-sectional view taken along the line 4—4 of FIG. 2.

DESCRIPTION OF THE PREFERRED EMBODIMENT

Figure 1:
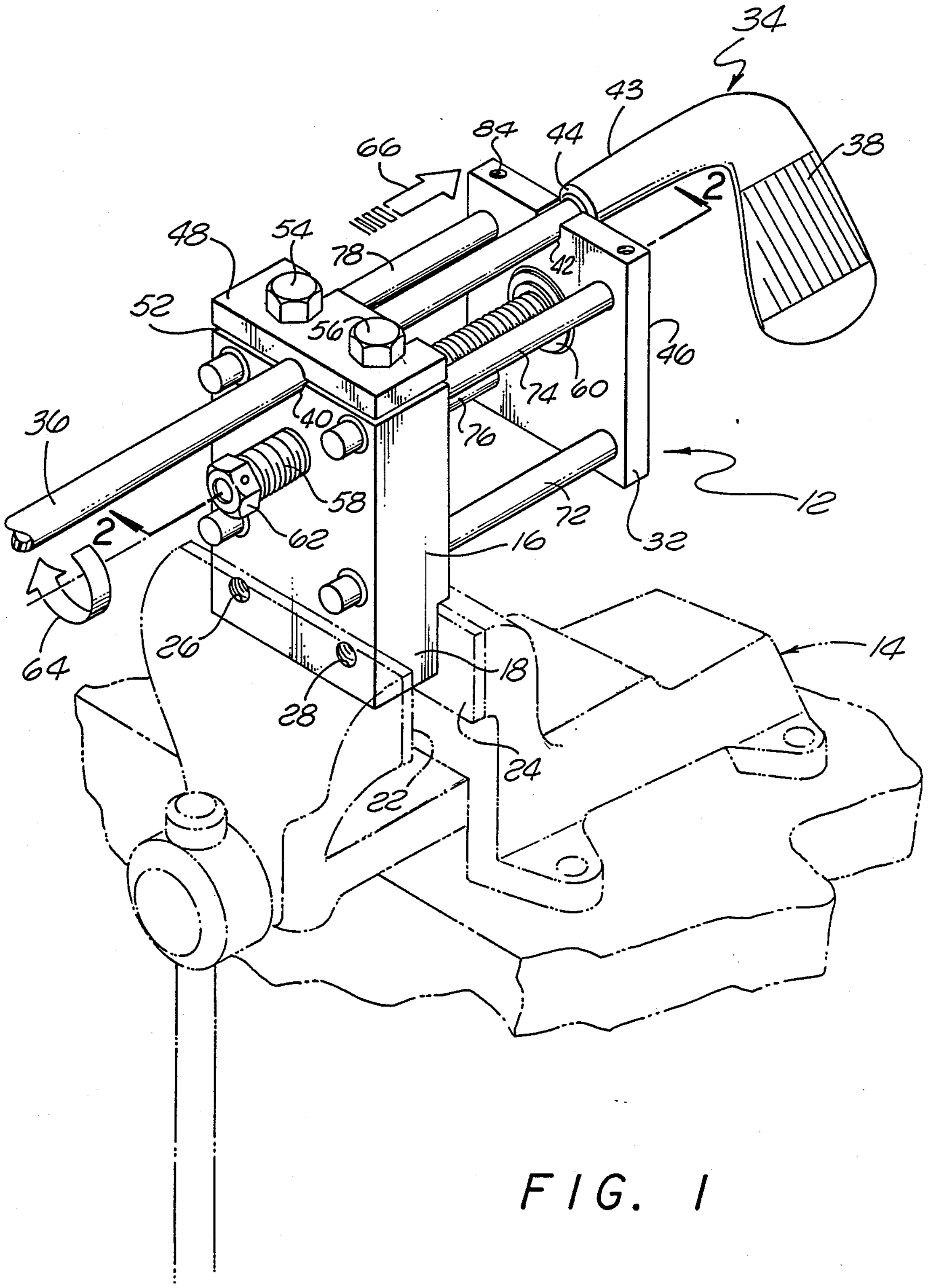
FIG. 1 is a perspective view of the golf club head removal tool shown secured to a vise.

Refering now to the drawings, it is shown in FIG. 1 a golf club head removal tool 12 constructed in accordance with the principles of the invention. The removal tool 12 is illustrated to a vise 14 shown in dotted lines. However, it should be understood that the vise 14 forms no part of this invention and is merely illustrated to show the mounting of the removal tool in one mode of operation. For example, the removal tool 12 includes a main block 16 having a reduced width mounting base 18. The mounting base 18 is illustrated being secured to the jaws 22 and 24 of the vise. The mounting base 18, however, could also be secured to a work bench (not shown). In this configuration, threaded openings 26 and 28 in the mounting base could be used to position bolts (not shown) therein for securing the main block 16 to a work bench.

The removal tool 12 also includes a force plate 32 which is of generally planar configuration and mounted in a plane parallel to the plane of the main block 16.

A golf club 34 contains a shaft 36 and an iron head 38. The golf club 34 is positioned on the tool so that its shaft is positioned in a semi-circular opening 40 formed in the top surface of the main block 16 and an opening 42 formed in the top surface of the force plate 32. The hosel 43 of the iron head 38 is positioned so that its end flange 44 which is formed in a plane perpendicular to the axis of the golf club shaft 36 abuts the outer side surface 46 of the force plate 32.

To lock the golf club 34 in this position for removal of the iron head 38 with respect to the shaft 36, a shaft locking plate 48 is secured to the top surface 52 of the main block by means of a pair of bolts 54 and 56 which pass through the locking plate 48 and are threaded into the main block 16 (FIG. 3).

A drive bolt 58 interconnects the main block 16 and a force plate 32. The drive bolt is secured at one end by means of a bearing 60 to the force plate 32. Rotation of the drive bolt head 62 in the direction shown by the arrow 64 will cause the force plate 32 to move further away from the main block 16. With this movement shown by the arrow 66, the force plate 32, which is juxtaposed at its outer side surface 46 to the end flange 44 of the golf club head 38, causes the head to move with respect to the shaft 36, as will be explained hereinafter.

One problem of prior art golf club head removal tools has been that the force plate 32 can rotate with respect to the golf club shaft 36. In graphite shafts, it has been found that the fiber of the shaft can be destroyed during this rotation.

To prevent rotation of the golf club shaft 36 with respect to the golf club head during removal, a plurality of stabilizing pins 72, 74, 76 and 78 are interconnected between the force plate 32 and the main block 16. The stabilizing pins 72, 74, 76 and 78 are each formed so that their axes are parallel to the axis of the drive bolt 58. The stabilizing pins 72, 74, 76 and 78 are secured by means of set screws 82 (one of which is shown in FIG. 4) which extend through openings 84 on the top and bottom surfaces of the force plate 32. In a typical operation, the set screws 82 are adjusted so that the main block 16 and the force plate 32 are each in parallel planes with respect to each other. Thereafter, rotation of the drive bolt 58 will not cause the drive shaft 36 to rotate with respect to the golf club head 38 during the removal process as the force plate cannot rotate with respect to the golf club shaft.

As illustrated in FIG. 3, the axis of the drive bolt 58 is positioned so that it is not symmetrical with the axes of the stabilizing pins, 72, 74, 76 and 78. In FIG. 3, the drive bolt 58 axis is illustrated positioned slightly above the intersection of planes formed parallel to and interconnecting diagonally opposed stabilizing pins. This drive bolt position has been chosen so that no tilt of the force plate 32 will occur as pressure is applied to the golf club head by the force plate. Of course, the drive bolt head could also positioned slightly below the intersection as well.

In operation, the golf club head hosel 43 is placed adjacent the force plate outer surface 46 with the head flange 44 juxtaposed therewith. With the golf club shaft 36 positioned in the openings 42 and 40, in the force plate 32 and the main block 16, the locking plate 48 is secured to prevent movement of the golf club shaft 36 with respect to the main block. The ferrule (not shown) normally found at the end flange 44 of the golf club head has been removed. This ferrule normally forms a seal at the junction of the golf club head 38 and the shaft 36. Then heat from a propane torch is applied to the hosel portion 43 of the golf club head 38 for approximately five to ten seconds to break the glue bond between the shaft 36 and the inner part of the hosel 43. Typically, the shaft 36 extends one and a half inches into the hosel. After heat is applied for about five to ten seconds, the drive bolt 58 is rotated and approximately five seconds later, the glue bond is broken. The heat source is then removed and rotation is continued until the force plate 32 moves the golf club head from the shaft 36.

While the invention has been described as removing an iron head from a metal shaft, it should be understood that for wood shafts, which are of smaller diameter, an adaptor plate can be inserted into the pusher plate opening 42 to remove such wood shafts from the heads.

The stabilizing pins 72, 74, 76, and 78 slide freely through the main block 14 as they are mounted on oillite bronze bushings. Further, the drive bolt 58 is attached at its end to the force plate 32 by means of a Fafnir SAS 200KDDg bearing.

What is claimed is:

1. A golf club head removal tool comprising:

a main block having means for securing said removal tool to a fixed member and a locking plate for securing said golf club shaft to said main block;

a force plate formed in a plane parallel to said main block plane and having an opening therein for positioning said golf club shaft therein;

a drive bolt secured to said force plate and movable with respect to said main block along an axis perpendicular to said force plate plane for moving said force plate with respect to said main block; and stabilizing means for keeping said force plate in a plane perpendicular to said drive bolt when said force plate moves with respect to said main block comprising a plurality of diagonally opposed pins whose axis are perpendicular to the plane of said force plate and secured thereto, said pins being interconnected between said force plate and said main plate, said drive bolt axis being intermediate and offset from the intersection of planes formed parallel to and interconnecting said diagonally opposed stabilizing pins.

2. A removal tool in accordance with claim 1 wherein said pins are movable with respect to said force plate prior to being secured thereto for enabling said main block and said force plate to be positioned in parallel planes with respect to each other.

* * * * *